United States Patent [19]
Smith

[11] Patent Number: 5,640,949
[45] Date of Patent: Jun. 24, 1997

[54] PORTABLE BARBECUE GRILL AND TABLES FOR MOUNTING ON A TRAILER HITCH AT THE REAR OF A VEHICLE

[76] Inventor: Anthony S. Smith, 6631 W. 152nd St., Overland Park, Kans. 66223

[21] Appl. No.: 559,433

[22] Filed: Nov. 15, 1995

[51] Int. Cl.⁶ .................................................. F24C 1/16
[52] U.S. Cl. ..................... 126/276; 126/25 R; 126/268; 126/30
[58] Field of Search .................... 126/276, 41 R, 126/25 R, 268, 30

[56] References Cited

U.S. PATENT DOCUMENTS

| | | | |
|---|---|---|---|
| 2,867,471 | 1/1959 | Coon, Jr. | 126/38 X |
| 4,518,189 | 5/1985 | Belt | 126/24 X |
| 4,665,891 | 5/1987 | Nemec et al. | 126/25 R |
| 4,667,651 | 5/1987 | Groeneweg | 126/25 R |
| 4,672,944 | 6/1987 | Curry | 126/25 R |
| 4,688,541 | 8/1987 | Stephen et al. | 126/25 R |
| 4,848,316 | 7/1989 | Beller | 126/276 |
| 5,029,935 | 7/1991 | Dufrancatel | 126/276 X |
| 5,188,089 | 2/1993 | Hamilton | 126/30 |
| 5,255,664 | 10/1993 | Gurliacci | 126/276 |
| 5,263,467 | 11/1993 | Jones | 126/42 |
| 5,472,164 | 12/1995 | Contee, Jr. | 126/25 R X |

*Primary Examiner*—Larry Jones
*Attorney, Agent, or Firm*—Kenneth W. Iles

[57] ABSTRACT

A portable barbecue grill assembly can be readily attached to the trailer receiver hitch of a motor vehicle and cantilevered therefrom to allow the assembly to be taken freely anywhere. The apparatus includes a principal support arm projecting horizontally outwardly from the rear of the vehicle and an upturned portion, to which an ash saucer is attached, and bolts therethrough anchor a kettle-type barbecue grill having a removable dome-shaped cover. Two food preparation and serving tables are attached to table supporting arms connected to the principal supporting arm below the ash saucer. The table tops, table supporting arms, and ash saucer are readily attachable and detachable by means of snap fastener pins.

15 Claims, 4 Drawing Sheets

PORTABLE BARBECUE GRILL AND TABLES FOR MOUNTING ON A TRAILER HITCH AT THE REAR OF A VEHICLE

BACKGROUND OF THE INVENTION

1. Field of the Invention

The present invention is related to an apparatus for providing convenient portable cooking and food serving by barbecue or grilling cooking techniques. More particularly, the present invention is directed to a barbecue grill and associated tables that can be mounted on the trailer hitch of a motor vehicle.

2. Description of Related Art Including Information Disclosed Under 37 C.F.R. Sections 1.97–1.99

In many instance, people want to cook and dine out-of-doors in locations remote from home. In some locations, picnic grounds provide fireplaces, free standing grills and the like may be provided, but they are often inconveniently located or already in use. In other locations no such facilities are available, for example, in parking lots, roadside rest stops and the like. At many sporting events, fans go to the stadium hours before the game and cook out, but they must take their own cooking and dining facilities.

Some efforts to provide portable cooking facilities have been patented, but for a number of reasons, these efforts do not provide the convenience required to make such outdoor dining experiences as easy and pleasant as possible.

U.S. Pat. No. 5,263,467 provides a grill that is attached to an inside wall of a cargo hold in a camper truck or the like by a pivoting cantilevered arm. This apparatus of course requires a substantial volume of on-board storage space that cannot conveniently be used for any other purpose. It also carries a substantial risk that hot coals may be closed up in the vehicle cargo hold when the grill is stored there, creating an unnecessary fire hazard.

U.S. Pat. No. 5,188,089 discloses a grill support in the form of a wire rack that can be attached to a balcony rail, ladder of the like, which might be modified for attachment to a motor vehicle, but this apparatus provides no work surfaces for food preparation or serving and is only an accessory to a more complex outdoor cooking system.

U.S. Pat. No. 4,848,316 discloses a dedicated single axle two-wheel trailer for outdoor cooking, but this apparatus clearly substantially increases the difficulty of driving and parking the pulling vehicle and is very expensive.

U.S. Pat. No. 4,688,541 discloses an attachment for a standard barbecue grill comprising a horizontal wire frame attached at one end to a standard barbecue grill and supported at the other end by a pair of legs. A shelf is placed onto the frame for use in food preparation and serving. This device, with attached barbecue grill, is not readily portable and requires some setup.

U.S. Pat. No. 4,672,944 discloses a mini-kitchen for use with a pickup truck, which is bolted to the floor of the pickup truck and rests on the side walls of the truck bed. Thus, this apparatus is more or less permanently anchored to the truck, reducing the utility of the truck, leading to rust problems that occur whenever the sheet metal of a motor vehicle is penetrated, and requires the cook to work in the bed of the truck, which most users would probably not like.

U.S. Pat. No. 4,665,891 discloses a free standing cylindrical cooker supported on four legs, two of which have small wheels at their ends. This apparatus is not portable and could not be towed by a motor vehicle safely.

Therefore, a need exists for a barbecue grill that can be easily attached to and removed from a motor vehicle; that includes associated food preparation and serving surfaces; that allows full use of the motor vehicle's storage space; that requires little or no setup; that does not substantially affect handling, turning, or parking of the motor vehicle.

SUMMARY OF THE INVENTION

Accordingly, it is a primary object of the present invention to provide a barbecue grill that can be easily attached to and removed from a motor vehicle.

It is another object of the present invention to provide a barbecue grill that includes associated food preparation and serving surfaces;

It is another object of the present invention to provide a barbecue grill that allows full use of the motor vehicle's storage space.

It is another object of the present invention to provide a barbecue grill that requires little or no setup.

It is another object of the present invention to provide a barbecue grill that does not substantially affect handling, turning, or parking of the motor vehicle.

These and other objects of the present invention are achieved by providing a grill supporting arm of tubular steel that is attached to a conventional tubular trailer hitch coupler of the type commonly known as a receiver hitch and that supports a conventional barbecue grill which is mounted on an ash saucer. One table is secured to each of two table supporting arms extending outwardly from the grill supporting arm. Various hardware fittings secure the various parts together while allowing rapid and easy assembly and disassembly.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE PREFERRED EMBODIMENTS

As required by the Patent Statutes and the case law, the preferred embodiment of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

Figure 1:
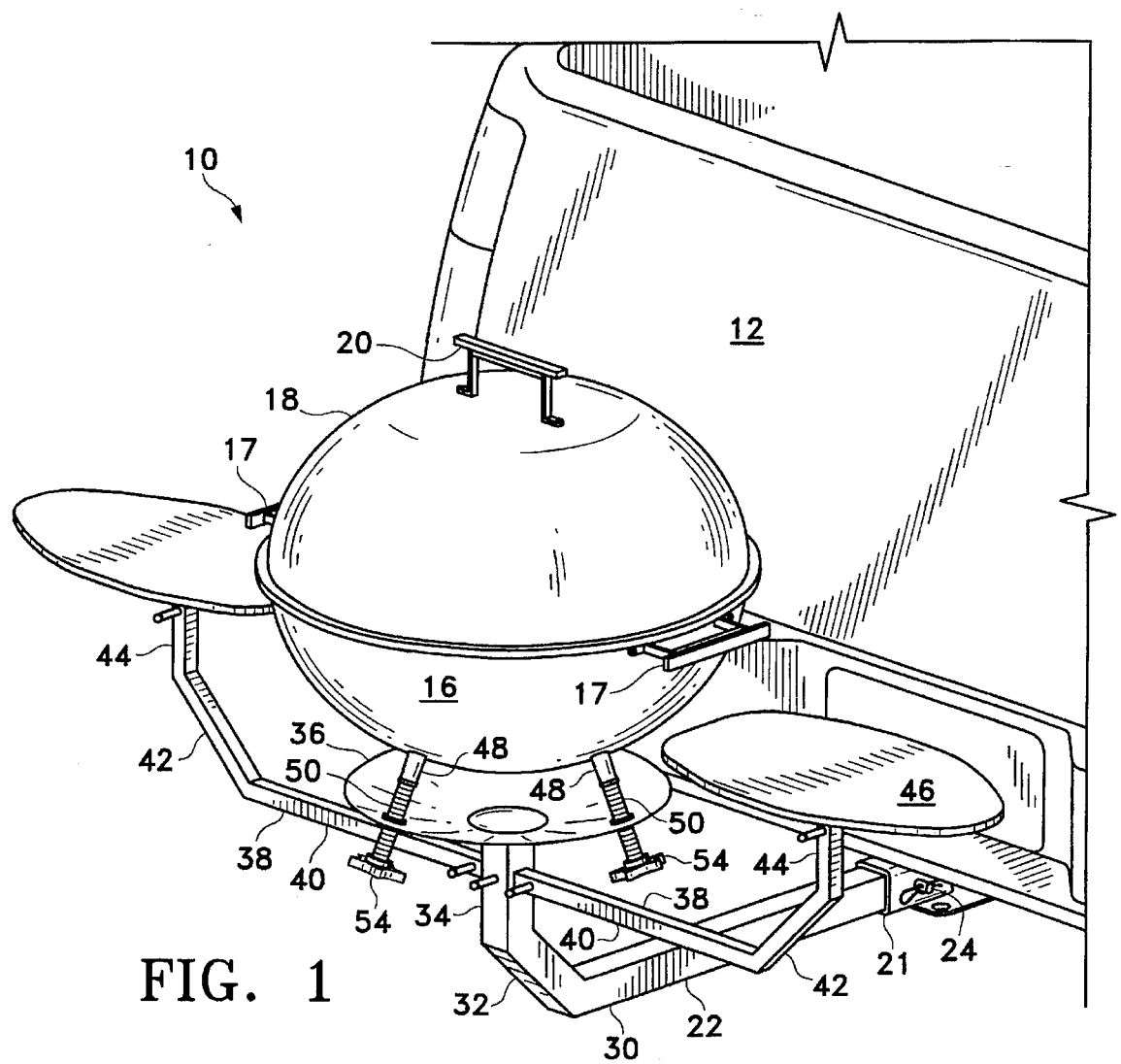
FIG. 1 is a right-hand front perspective view of a portable barbecue grill and tables according to the present invention shown attached to a trailer receiver hitch of a vehicle.
Figure 2:
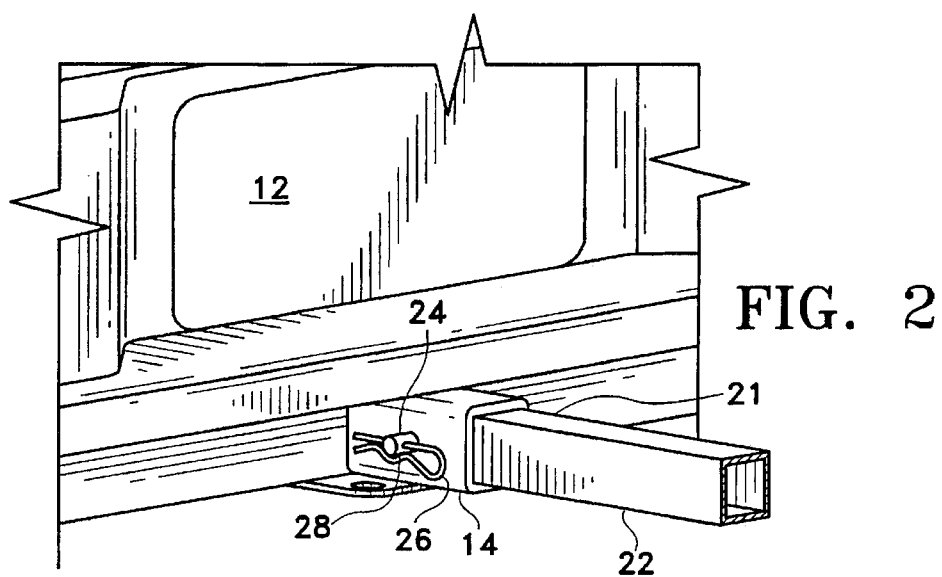
FIG. 2 is an enlarged fragmentary right-hand perspective view of the attachment means for the barbecue grill and tables of FIG. 1.
Figure 3:
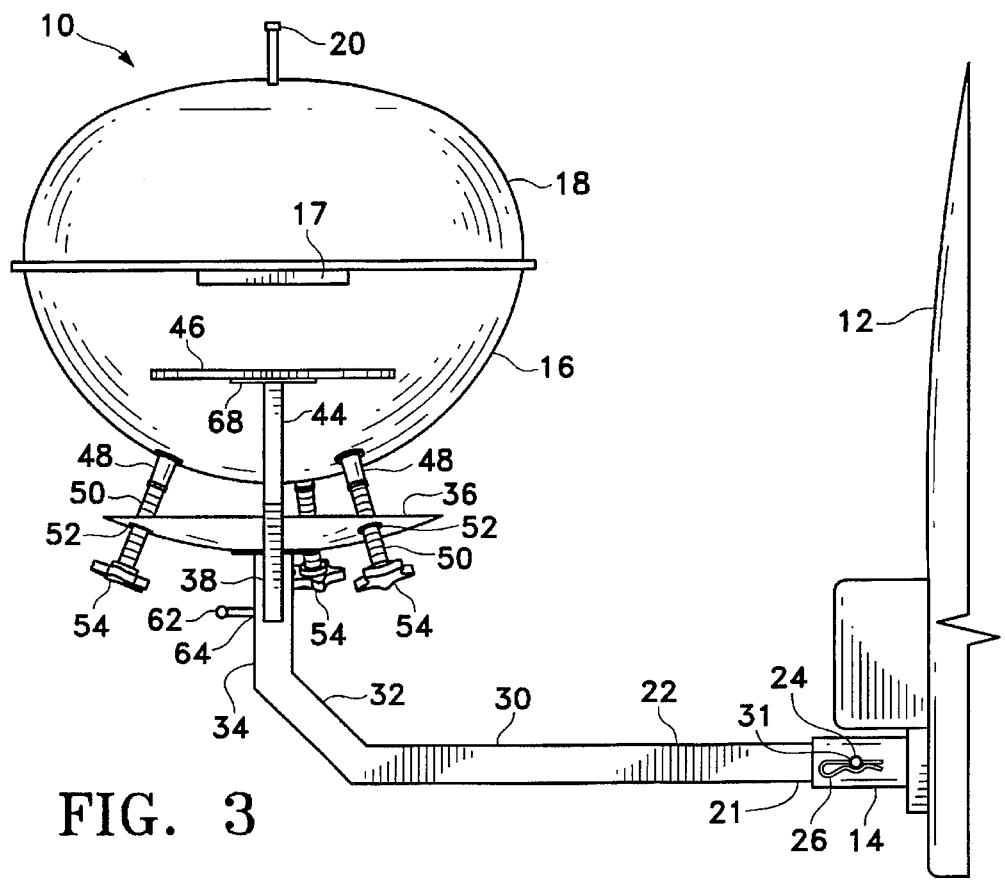
FIG. 3 is right-hand side elevation of the barbecue grill and tables of FIG. 1 shown attached to a vehicle.
Figure 4:
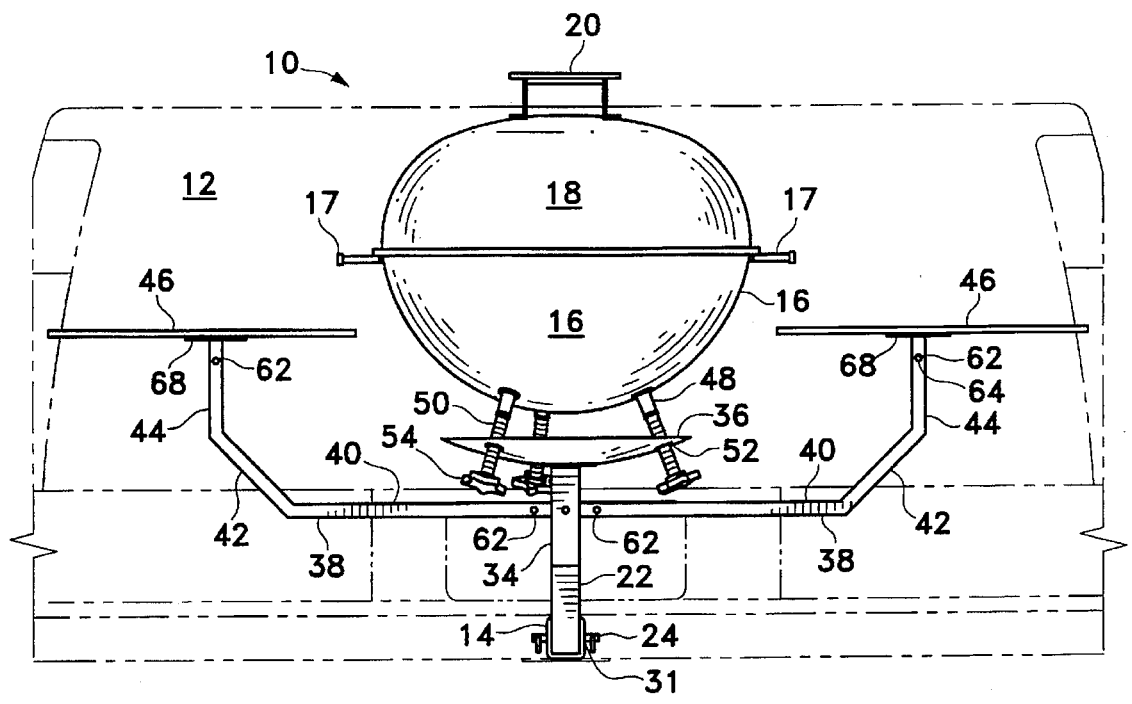
FIG. 4 is rear elevation of the barbecue grill and tables of FIG. 1.

Referring to FIG. 1, there is shown a portable barbecue grill apparatus 10 according to the present invention attached to a vehicle 12 trailer hitch tube 14 of a receiver hitch. The barbecue grill apparatus 10 includes a kettle-type grill 16 comprising substantially a hemisphere shaped grill with a grill handle 17 on each side of a diameter of the kettle-type grill 16 near a top edge and having a removable dome-shaped removable cover 18 with an attached handle 20. A distal end 21 of a cantilevered supporting arm 22, consisting of a square metal tube, is inserted into the trailer receiver hitch tube 14 and secured therein by a locking pin 24 through aligned apertures 31 in the trailer receiver hitch tube 14 and the principal supporting arm 22 and is secured therein by a cotter pin 26 through an aperture 28 through the cotter pin 26 (See FIG. 2).

The principle supporting arm 22 extends rearwardly of the vehicle 12 along a horizontal portion 30, which is welded to an upwardly angled portion 32, which in turn is welded to vertical portion 34 each also made of square cross section steel tubing. An ash saucer 36 is welded to the top of the vertical portion 34 of the principal supporting arm 22. Adjacent to the ash saucer 36 and immediately below it, a table supporting arm 38 is welded to the vertical portion 34 of the principal supporting arm 22. Two table supporting arms 38 are used, with one on each of two sides of the vertical portion 34 of the principal supporting arm 22. Each table supporting arm 38 includes a horizontally projecting table arm portion 40 welded to an upwardly angled table arm portion 42, which is welded to a vertical table arm portion 44. A table top 46, which may conveniently made of finished wood, is attached to each of the table supporting arms 38 as described below. The kettle-type grill 16 includes three tubular mounting sleeves 48. A bolt 50 is pushed into each tubular mounting sleeve 48 by turning the bolt 50 through a threaded sleeve 52 in an aperture in the ash saucer 36, as described in more detail below.

Referring to FIGS. 2–5, the bolts 50 include a star knob 54 to facilitate easy tightening and loosening through the threaded sleeves 52 in the ash saucer 36, which are angled such that the bolts 50 align with and are parallel to the tubular mounting sleeves 48. These components are equally spaced about their respective apparatus elements, that is, at 60 degrees of arc. As seen most clearly in FIG. 5, when the bolts 50, which fit firmly inside the tubular mounting sleeves 48, are tightened as they penetrate further into the tubular mounting sleeves 48, the bolts 50 and the tubular mounting sleeves cooperate to bind the kettle-type grill 16 tightly and securely so that substantial force would be required to remove the kettle-type grill from the ash saucer 36. Alternatively, the tubular mounting sleeves 48 may themselves be threaded. The ash saucer 36 catches any ashes or coals that may fall through the ash emptying bottom of the kettle-type grill 16 or air access vent holes that may be provided in the lower portion of the kettle-type grill 16. This system for mounting the kettle-type grill 16 allows a user to use the same kettle-type grill with the present invention, as well as with the higher legs of a conventional home barbecue grill, permitting both home use and the vehicle use described here. It also allows the kettle-type grill 16 to be easily removed from the portable barbecue grill apparatus 10 for cleaning.

Figure 5:
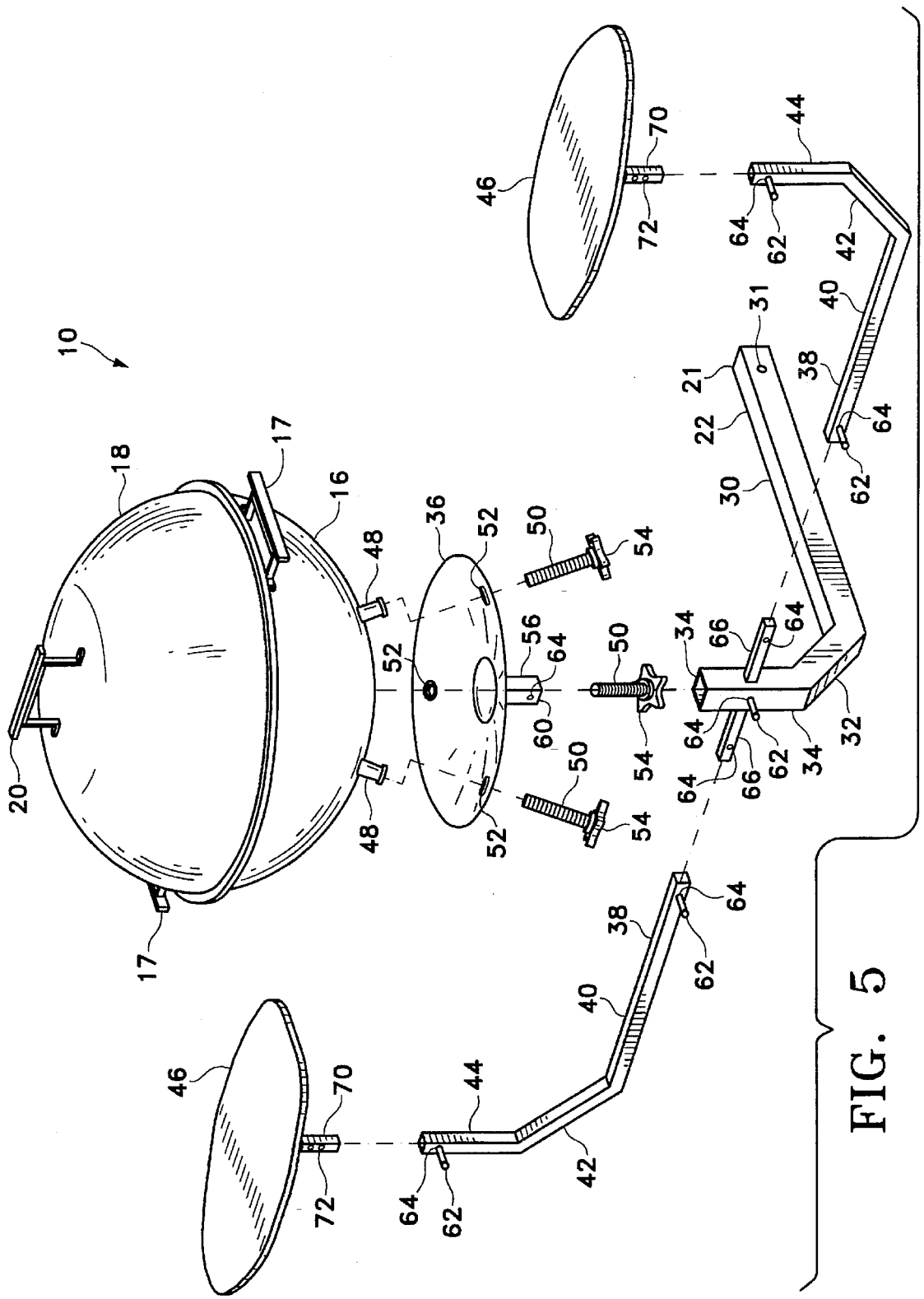
FIG. 5 is an exploded right-hand front perspective view of the barbecue grill and tables of FIG. 1.
Figure 6:
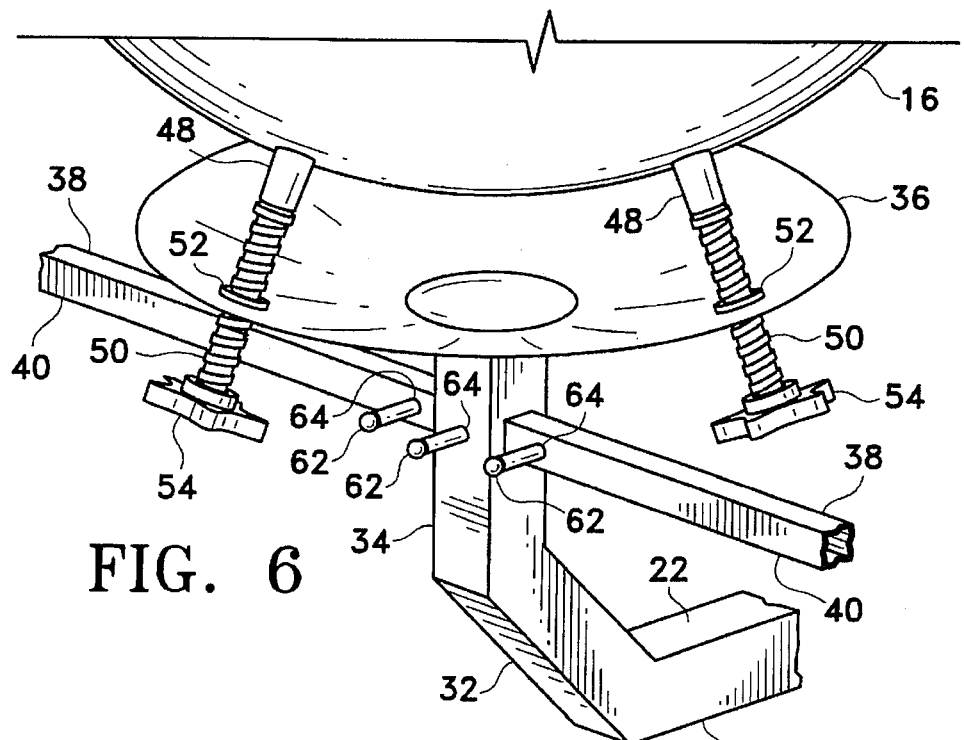
FIG. 6 is an enlarged right-hand fragmentary perspective view of the lower portion of the barbecue grill illustrating its attachment to the cantilevered supporting arm.
Figure 7:
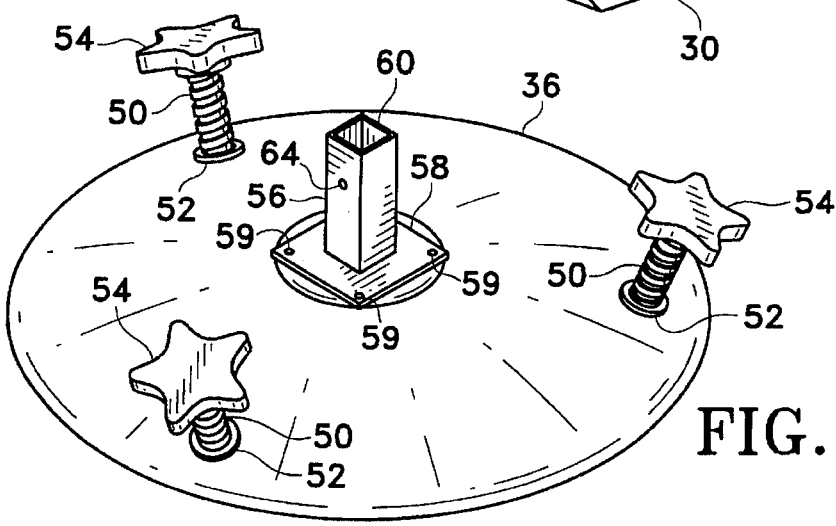
FIG. 7 is an enlarged perspective view of the grill supporting ash saucer in an inverted position illustrating the means for attaching the grill to the supporting ash saucer.

Referring to FIGS. 5, 6, and 7 a saucer mounting stub tube 56 with a reinforcing plate 58 is fastened to the bottom of the ash saucer 36 by the sheet metal screws 59 or the like, and the distal end 60 is received inside the vertical portion 34 of the principal supporting arm 22, to which it is secured by a snap fastener pin 62 secured through aligned apertures 64 through the stub tube 60 and the vertical portion 44.

Referring to FIG. 5, the table supporting arms 38 slip over corresponding table stub arms 66, which extend horizontally and which are welded to the vertical portion 34 of the principal supporting arm 22. A snap fastener pin 62 penetrates the aligned apertures 64 in these parts.

Figure 8:
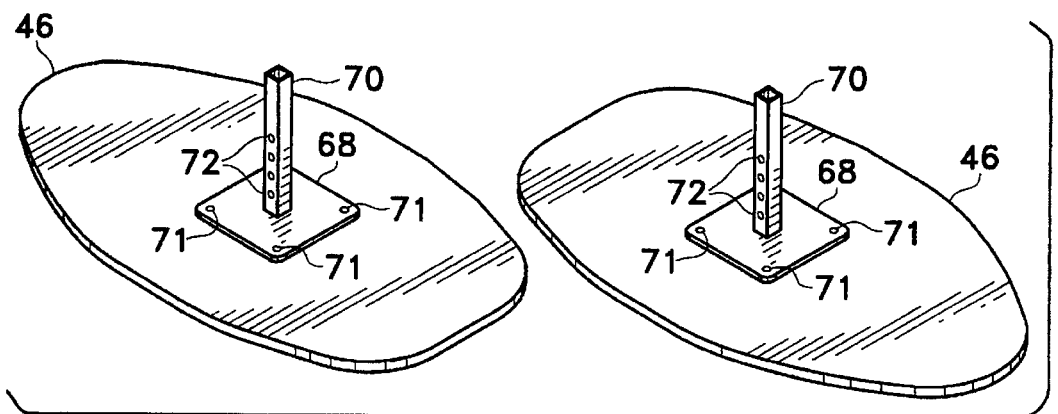
FIG. 8 is an enlarged perspective view of the tables of the present invention shown in inverted position to illustrate the means for attaching them to their respective table supporting arms.

Referring to FIG. 8, the bottom surface of each table top 46 includes a metal reinforcement plate 68 attached to the bottom surface of each table top 46 by four wood screws 71 in each reinforcement plate 68. Each reinforcement plate 68 includes a stub table support column 70 welded thereto, with each column 70 further including a plurality of apertures 72 therethrough for allowing ready adjustment of the working height of the surfaces of the table tops 46. The stub table support columns 70 of table tops 46 are inserted into the open top ends of the vertical table arm portions 44 of the table supporting arms 38 and secured in place by a snap fastener pin 62 through a corresponding apertures in the vertical table arm portion 44 and the stub table support column 70.

When fully assembled as described above, the barbecue grill apparatus can be safely and conveniently left on the vehicle 12 while it is being driven and therefore requires no setup prior to use or taken down after use, until the vehicle has been driven back to its home base. The numerous and relatively small elements that the portable barbecue grill apparatus 10 breaks down into easily allow for storage and shipping in a reduced volume. The various supporting arms can be made of a single length of bent tubing having one or more bends of suitable radius, which may be uniform or not, as desired. The table tops 46 can be made of any convenient material, with highly finished wood being preferred, and in any shape, such as, for example, the shapes of various team or college logos. Naturally, fasteners other than the snap fastener pins described above can be employed, and, indeed, snap fasteners may be safely omitted in many places, such as in securing the arms 38 by having the table stub arms 66 fixed to the vertical portion 34 at an upward angle so that gravity holds the table arms 38 securely in place. The principal supporting arm 22 itself may be made from a single length of bent tubing. It has further been found that different means for mounting the barbecue grill 16 above the ash saucer 36 can be safely employed. For example, a tubular sleeve seated within a larger tubular sleeve that is fixed to the ash saucer can be pushed into engagement with the tubular mounting sleeve 48 and held in their locking position by a snap fasteners. Further, for example, it does not really matter which of two mated tubes fits inside the other.

While the present invention has been described in accordance with the preferred embodiments thereof, the description is for illustration only and should not be construed as limiting the scope of the invention. Clearly, as described above, various changes and modifications may be made by those skilled in the art without departing from the spirit and scope of the invention as defined by the following claims.

I claim:

1. A barbecue grill apparatus comprising:
   a. a principal supporting arm having a distal end adapted for attachment to a trailer hitch tube and extending horizontally away from a motor vehicle; and
   b. a barbecue grill; and
   c. means for mounting said barbecue grill on said principal supporting arm, wherein said mounting means further comprises an ash saucer fixed to a vertical portion of said principal supporting arm, said ash saucer comprising a plurality of grill fasteners therethrough and an aligned plurality of mounting sleeves on said barbecue grill, with each said grill fastener penetrating one said mounting sleeve.

2. A barbecue grill apparatus in accordance with claim 1 wherein said ash saucer further comprises a depending saucer mounting stub fixed to a bottom surface of said ash saucer and having a distal end seated within said principal supporting arm.

3. A barbecue grill apparatus in accordance with claim 1 further comprising at least one table supporting arm removably attached to said principal supporting arm and a table removably attached to said table supporting arm.

4. A barbecue grill apparatus in accordance with claim 3 wherein said table further comprises a table top having a depending stub table supporting column seated within said table supporting arm and a plurality of spaced apertures therethrough whereby the working height of said table can be adjusted.

5. A barbecue grill apparatus in accordance with claim 4 further comprising two said tables, each supported by a separate table supporting arm.

6. A barbecue grill apparatus in accordance with claim 5 wherein each said table supporting arms is detachably attached to a separate table stub arm fixed to said principal support arm.

7. A barbecue grill apparatus in accordance with claim 5 further comprising a snap fastener pin connecting each said table supporting arm to a separate table stub arm.

8. A barbecue grill apparatus in accordance with claim 1 wherein said barbecue grill further comprises a kettle-type barbecue grill having a removable cover.

9. A barbecue grill apparatus in accordance with claim 1 wherein said grill fasteners further comprise a plurality of fasteners, each including a star knob at a lower end and each threadably received by a separate threaded sleeve set into said ash saucer and each further received by one said mounting sleeve.

10. A barbecue grill apparatus comprising:
    a. a principal supporting arm having a distal end adapted for attachment to a trailer hitch tube and extending horizontally away from a motor vehicle, an upwardly angled portion and a vertical portion; and
    b. a barbecue grill comprising a plurality of tubular mounting sleeves; and
    c. means for mounting said barbecue grill on said principal supporting arm, said mounting means further comprising an ash saucer fixed to a vertical portion of said principal supporting arm, said ash saucer comprising a plurality of adjustable grill fasteners therethrough, with each said grill fastener penetrating one said tubular mounting sleeve.

11. A barbecue grill apparatus in accordance with claim 10 wherein said ash saucer further comprises a depending saucer mounting stub fixed to a bottom surface of said ash saucer and having a distal end seated within said principal supporting arm.

12. A barbecue grill apparatus in accordance with claim 10 wherein said adjustable grill fasteners further comprise a plurality of fasteners, each including a star knob at a lower end and each threadably received by a separate threaded sleeve set into said ash saucer and each further received by one said mounting sleeve.

13. A barbecue grill apparatus in accordance with claim 10 wherein said ash saucer mounting stub is detachably connected to said principal supporting arm by a snap fastener pin passing through aligned apertures in said mounting stub and said principal supporting arm.

14. A barbecue grill apparatus in accordance with claim 10 further comprising a pair of tables, each supported by a separate table supporting arm, means for connecting said table supporting arms to said principal supporting arm and means for detachably connecting said tables to said table supporting arms.

15. A barbecue grill apparatus in accordance with claim 14 wherein said connecting means further comprises a pair of table stub arms fixed to said principal supporting arm and a snap fastener pin through aligned apertures in each of said stub arms and said table supporting arms.

* * * * *